(12) United States Patent
Gostin et al.

(10) Patent No.: US 7,277,994 B2
(45) Date of Patent: Oct. 2, 2007

(54) COMMUNICATION IN PARTITIONED COMPUTER SYSTEMS

(75) Inventors: Gary Belgrave Gostin, Plano, TX (US); Nathan Dirk Zelle, The Colony, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 10/947,673

(22) Filed: Sep. 23, 2004

(65) Prior Publication Data

US 2006/0064566 A1 Mar. 23, 2006

(51) Int. Cl.
*G06F 12/00* (2006.01)
*G06F 13/00* (2006.01)
*G06F 13/28* (2006.01)

(52) U.S. Cl. ...................... 711/147; 709/215

(58) Field of Classification Search ............... 711/147; 709/215
See application file for complete search history.

(56) References Cited

U.S. PATENT DOCUMENTS

| | | | |
|---|---|---|---|
| 6,360,303 B1* | 3/2002 | Wisler et al. | 711/152 |
| 6,480,941 B1* | 11/2002 | Franke et al. | 711/153 |
| 6,631,447 B1* | 10/2003 | Morioka et al. | 711/141 |
| 2002/0161452 A1* | 10/2002 | Peltier | 700/2 |
| 2005/0240736 A1* | 10/2005 | Shaw | 711/146 |

* cited by examiner

*Primary Examiner*—Matthew Kim
*Assistant Examiner*—Edward J Dudek

(57) ABSTRACT

One embodiment of a computer system has processors, having address spaces the processors can address directly. Each address space is directly linked to at least one other address space by memory within more than its own address space. The total size of the address spaces within the system linked together either directly or through directly linked address spaces is greater than the address space any resource within the system can address directly.

34 Claims, 3 Drawing Sheets

COMMUNICATION IN PARTITIONED COMPUTER SYSTEMS

BACKGROUND

A processor or other resource in a computer system may be capable of addressing memory and other resources directly using an address of a definite size. The maximum length of address that a resource can handle determines the extent of the address space that resource can address. A resource can access locations outside its own address space, but this typically requires indirect addressing procedures that require both time and resources. In a multi-processor system, several cells may be arranged to share a "coherency domain" of common, directly addressable address space. However, because each cell must generally be able to address the entire coherency domain directly, the total size of the coherency domain, and thus the sum of the sizes of the cells, is then limited to the address space of any one processor.

BRIEF DESCRIPTION OF THE DRAWINGS

For purposes of illustrating the invention, the drawings show one or more forms in which the invention can be embodied. The invention is not, however, limited to the precise forms shown. In the drawings.

DETAILED DESCRIPTION

Figure 1:
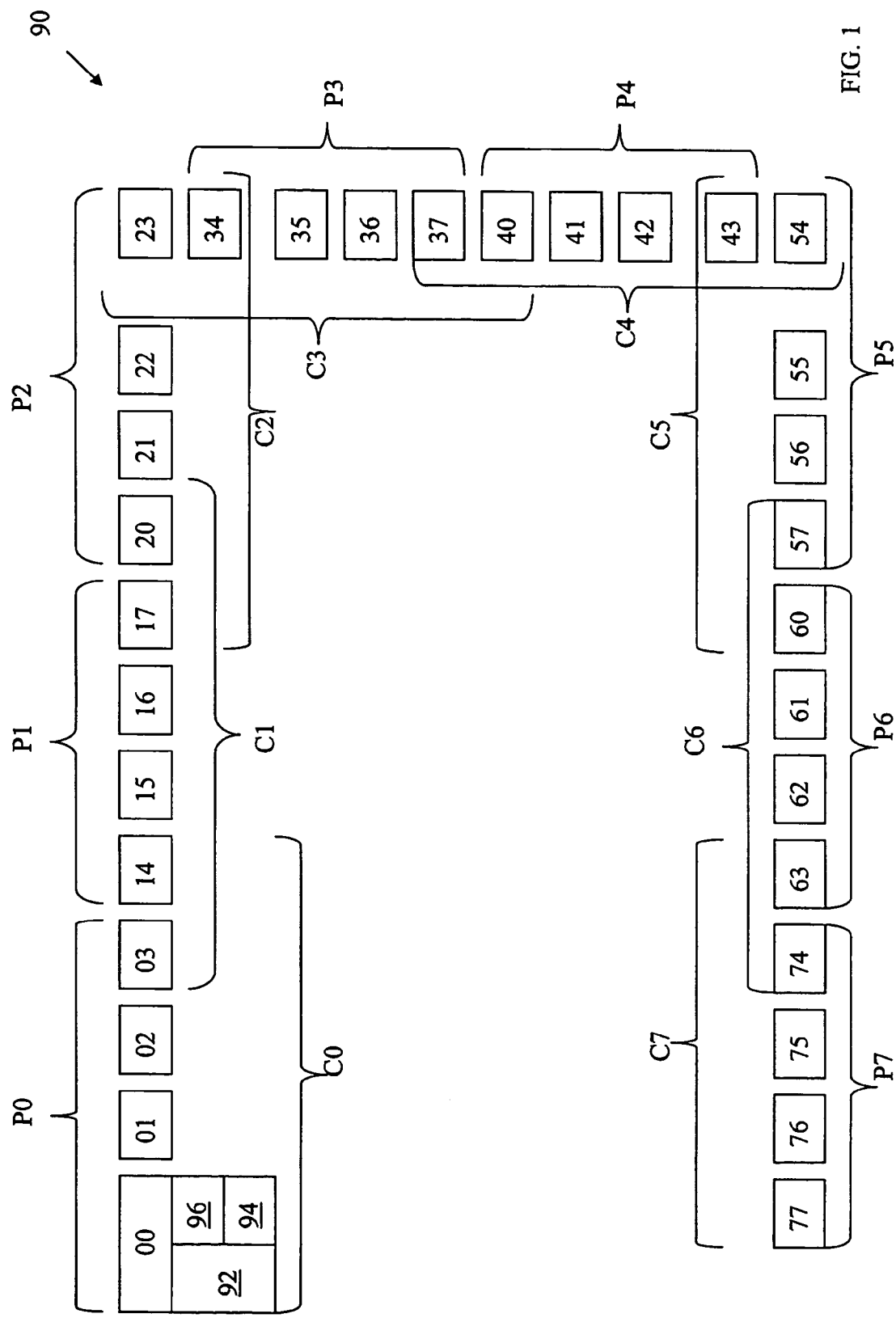
FIG. 1 is a block diagram of one embodiment of a computer system according to an embodiment of the invention.

Referring to the accompanying drawings, and initially to FIG. 1, one embodiment of a computer system according to the invention, indicated generally by the reference numeral 90, has a plurality of cells 00 . . . 77, each including, among other things, at least one processor 92 and memory 94 controlled by a memory controller 96. In this embodiment, each cell may be identical, and the processor 92 and memory controller 96 in each cell are capable of addressing an address space that is large enough to cover eight cells. In this embodiment, the cell is identified in addresses by the most significant bits of the address, corresponding to the right hand digit of the cell number in FIG. 1. Memory accesses within the address space of the originating cell can be fast, because the originating cell or processor can specify directly the address of the memory to be accessed, eliminating the latency that would be caused by interpreting an indirect address.

Each cell may belong to a partition P0 . . . P7, identified by the left-hand digit of the cell number in FIG. 1. In this embodiment, the cells within a partition can freely read data from and write data to any memory within the same partition. Restrictions may be imposed on reading data from, and stricter restrictions may be imposed on writing data to, memory within another partition.

The processor 92 in each cell 00 . . . 77 also has a "processor coherency domain," which is a range of cells that may be larger than a partition, but is not larger than the address space of the processor, within which that processor can communicate directly with the memory controllers 96. The processor 92 may be allowed to read data from and write data to memory that is outside its own partition but within the coherency domain of the processor that originates the read or write. Where such reads and writes are permitted, however, they are directly addressed and take place with the corresponding low latency. The memory controller 96 in each cell 00 . . . 77 also has a "memory controller coherency domain," which is a range of cells that may be larger than a partition, but is not larger than the address space of the memory controller, within which that memory controller can communicate directly with the processors 92. As will be explained below, the processor coherency domain for the processor in a cell is not necessarily the same as the memory controller coherency domain for the memory controller in the same cell. Where they are the same, or where it is not necessary to distinguish between them, the term "coherency domain" may be used to denote concisely either or both of the processor coherency domain and the memory controller coherency domain.

In this embodiment, partition P0 contains cells 00, 01, 02, 03. The processors in the cells in partition P0 have a processor coherency domain C0, which contains memory in those four cells plus memory in cell 14, which belongs to partition P1. Partition P1 contains cells 14, 15, 16, 17. The processors 92 in partition P1 have a processor coherency domain C1, which contains memory in those cells plus memory in cell 03, which belongs to partition P0, and cell 20, which belongs to partition P2. Partition P2 contains cells 20, 21, 22, 23. The processors in partition P2 have a processor coherency domain C2, which contains memory in those cells plus cell 17, which belongs to partition P1, and cell 34, which belongs to partition P3. Partition P3 contains cells 34, 35, 36, 37. The cells in partition P3 have a processor coherency domain C3, which contains memory in those cells plus cell 23, which belongs to partition P2, and cell 40, which belongs to partition P4. Partition P4 contains cells 40, 41, 42, 43. The cells in partition P4 have a processor coherency domain C4, which contains memory in those cells plus cell 37, which belongs to partition P3, and cell 54, which belongs to partition P5. Partition P5 contains cells 54, 55, 56, 57. The processors in partition P5 have a processor coherency domain C5, which contains memory in those cells plus cell 43, which belongs to partition P4, and cell 60, which belongs to partition P6. Partition P6 contains cells 60, 61, 62, 63. The processors in partition P6 have a processor coherency domain C6, which contains memory in those cells plus cell 57, which belongs to partition P5, and cell 74, which belongs to partition P7. Partition P7 contains cells 74, 75, 76, 77. The cells in partition P7 have a processor coherency domain C7, which contains memory in those cells plus cell 63, which belongs to partition P6.

As may be seen from FIG. 1, any cell 00 . . . 77 can identify other cells in the same partition P0 . . . P7 unambiguously by the right-hand digit of the cell number. Because this digit represents the most significant bits of an address, a device in a cell can address unambiguously other parts of the partition to which that cell belongs, and can thus target a resource that has an address in the same partition. In addition, a processor 92 in a partition can target directly the memory controllers 96 in the two cells that are outside that partition but in the processor coherency domain of the processor in question. For example, the processors 92 in cells 34, 35, 36, 37 in partition P3 can target directly the memory controllers in all of cells 23, 34, 35, 36, 37, 40. Similarly, the processors 92 in cells 40, 41, 42, 43 in partition P4 can target directly the memory controllers in all of cells 37, 40, 41, 42, 43, 54.

The converse does not apply in this embodiment. For example, the memory controller 96 in cell 37 can be targeted by the processors 92 in cells 34, 35, 36, 37, 40, 41, 42, 43. Therefore, that memory controller cannot communicate directly with the processor 92 in cell 23, because an address with the most significant bits "3" would be ambiguous between cell 23 and cell 43. Thus, it is possible to define memory controller coherency domains, but they are different from the processor coherency domains. Each pair of cells such as cells 37, 40 at the overlap of two processor coherency domains will have, for example, an eight-cell memory controller coherency domain, in this example cells 34, 35, 36, 37, 40, 41, 42, 43. The alternating pairs of cells in the middle of a partition will have a four-cell memory controller coherency domain consisting of the four cells in that partition. In the interests of clarity, the memory controller coherency domains are not marked in FIG. 1. Because in this embodiment the memory controller coherency domains are different from the processor coherency domains, logical addresses must be translated into physical routings through the inter-cell fabric of the computer system separately for messages originating from processors and for messages originating from memory controllers.

If data is to be transferred, for example, from cell 00 to cell 77, then the processor 92 of the source cell 00 can copy that data to memory in cell 03 or, subject to any restrictions on writing to another partition, to memory in cell 14. From the memory in cell 03 or 14, the processor of any cell in partition P1 can copy the data to cell 17 or 20. From cell 17 or 20, any cell in partition P2 can copy the data to cell 23 or cell 34. From cell 23 or 34, any cell in partition P3 can copy the data to cell 37 or 40, and so on. Eventually the data reaches cell 63 or 74, from which the data is directly accessible to the destination cell 77.

The data transfer may require a copy operation carried out by a cell that is neither the origin nor the destination of the data. For example, a transfer from memory in cell 03 to memory in cell 20 may be carried out by cell 15 or cell 16 or, as described above for the transfer from cell 00 to cell 77, a transfer may require copying by a cell in an intervening partition. The intermediate copying cell then needs to be aware that the data is to be copied, and where it is to be copied to. The data may then be presented in the form of a packet that has a message header indicating the destination partition for the packet. Any intermediate forwarding cell then merely needs to read the packet header and recognize that the packet is to be forwarded to the next processor coherency domain. The forwarding cell does not need to be actively notified of the routing of particular packets. In order to avoid the ambiguous addressing that would sometimes arise from direct processor-to-processor communication between cells in different partitions, some or all of the processors 92 may be programmed to regularly poll the memory areas in which packets for forwarding are placed, and to forward any new packet that arrives without external prompting.

As shown in FIG. 1, the computer system 90 has 8 processor coherency domains, each with 5 or 6 cells, and 8 partitions, each with 4 cells. By repeating the pattern of overlap shown for partitions P1 through P6 and processor coherency domains C1 through C6 in FIG. 1, the number of partitions in the computing system can be increased indefinitely.

If the address space format, as compared to the size of a cell, permits, the number of cells in a coherency domain may be greater than 8. However large the processor and memory controller coherency domains are, with the configuration shown in FIG. 1 the maximum number of cells in a partition is half the maximum number of cells in the address space.

As shown in FIG. 1, at each overlap between two adjacent processor coherency domains, two cells, one in each partition, belong to both processor coherency domains. This configuration allows highly secure restrictions to be applied to the transfer of data between domains. However, if one partition is allowed to write freely into a cell in the neighboring partition, then an arrangement with only one cell shared between two adjacent processor coherency domains is possible. For example, if all exchanges between partition P0 and partition P1 are written in cell 14, then cell 03 does not need to be in processor coherency domain C1. If the amount of traffic between partitions is large, each of the processor coherency domains C0 . . . C7 shown in FIG. 1 may be extended by one cell at each end so that, for example, processor coherency domain C3 also contains cells 22 and 41. This shares the burden of traffic over all of the memory controllers 96. Memory in cells that are not in a processor coherency domain other than the one spanning their own partition may be less vulnerable to disruption originating outside the partition. Processors that are not active in inter-partition traffic handling may have more capacity for other operations.

As described above, the chain-like arrangement of the partitions may require repeated copying of data that is to be transferred between cells that are far apart in the chain. By including cell 00 in processor coherency domain C7 and cell 77 in processor coherency domain C0, the chain of partitions shown in FIG. 1 can be changed into a ring. This reduces the maximum distance that data must travel to half the length of the chain, which may provide a useful reduction in latency when the chain is long.

Figure 2:
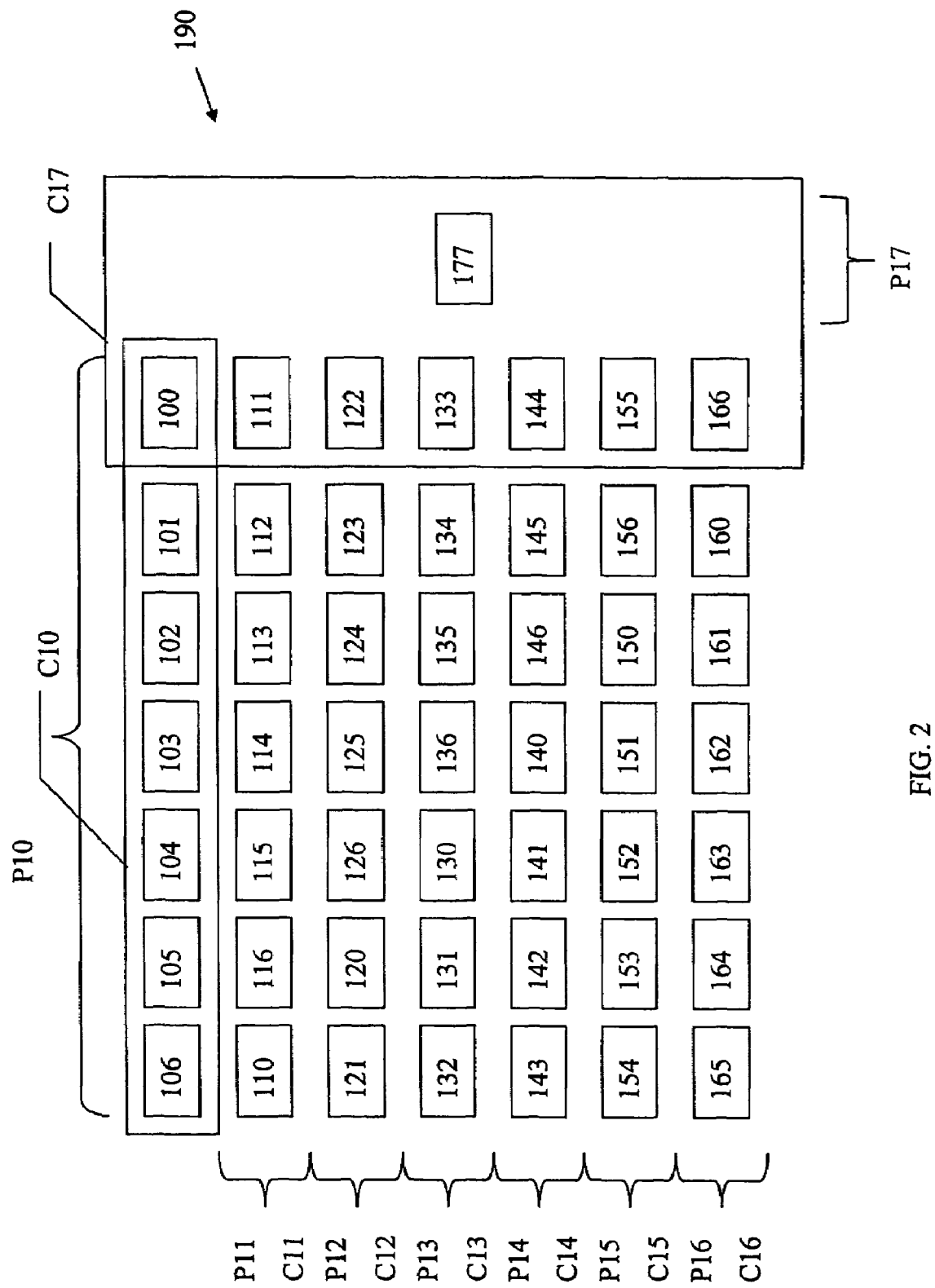
FIG. 2 is a block diagram of a second embodiment of a computer system according to an embodiment of the invention.

Referring now to FIG. 2, a second embodiment of a computer system according to the invention, indicated generally by the reference numeral 190, has a plurality of cells 100 . . . 177, which are internally similar to the cell 00 shown in FIG. 1, each including, among other things, a processor 92, memory 94, and a memory controller 96. In this embodiment, each cell may be identical, and the processors 92 in the cells are capable of addressing a processor coherency domain C10 . . . C17 of addresses. In this embodiment, the cell is identified in addresses by the most significant bits of the address, corresponding to the right-hand digit of the cell number. Memory accesses within a coherency domain can be fast, because the originating cell or processor can specify directly the address of the memory to be accessed, reducing the latency that would be caused by interpreting an indirect address.

The cells also belong to a partition P10 . . . P17. In this embodiment, the cells within a partition can freely read data from and write data to any memory within the same partition. Restrictions may be imposed on reading data from, and stricter restrictions may be imposed on writing data to, memory within another partition, even if the memory is within the processor coherency domain of the cell that originates the read or write.

In this embodiment, partition P10 and processor coherency domain C10 contain cells 100, 101, 102, 103, 104, 105, 106. Partition P11 and processor coherency domain C11 contain cells 110, 111, 112, 113, 114, 115, 116. Partition P12 and processor coherency domain C12 contain cells 120, 121, 122, 123, 124, 125, 126. Partition P13 and processor coherency domain C13 contain cells 130, 131, 132, 133, 134, 135, 136. Partition P14 and processor coherency domain C14 contain cells 140, 141, 142, 143, 144, 145, 146. Partition P15 and processor coherency domain C15 contain cells 150, 151, 152, 153, 154, 155, 156. Partition P16 and processor coherency domain C16 contain cells 160, 161, 162, 163, 164, 165, 166.

Partition P17 contains a single cell 177. Processor coherency domain C17 contains the cells 100, 111, 122, 133, 144, 155, 166 mentioned above, plus cell 177.

If data is to be transferred from one "spoke" partition P10 . . . P16 to another, for example, from cell 106 to cell 165, then the processor 92 of the source cell 106, or another cell in partition P10, can copy that data to the memory 94 of cell 100. From cell 100, the "hub" cell 177 can copy the data to cell 166. From cell 166, the data is directly accessible to the destination cell 165, or can be copied to cell 165 by another cell in partition P16.

The forwarding of packets in the embodiment of FIG. 2 differs from that in the embodiment of FIG. 1 because in FIG. 2 the "hub" cell 177 reads the message header on a packet of data and decide which "spoke" partition P10-P16 the packet is to be delivered to.

In the embodiment shown in FIG. 2 as just described, the hub cell 177 is in the memory controller coherency domain of the "border" cells 100, 111, 122, 133, 144, 155, 166, but is not in the processor coherency domains of those cells. As a result, all traffic between spoke partitions is handled by the processor in the hub cell 177 reading packets from one border cell and writing them to another border cell. This arrangement minimizes the use of resources in the spoke partitions P10 . . . P16 for traffic handling. Alternatively, the border cells 100 . . . 166 may have processor coherency domains that include the hub cell 177. In that case, the border cell 100 may copy the data directly from the source cell 106 to memory on the hub cell 177, and border cell 166 may copy the data directly from cell 177 to the destination cell 165.

Even if the copying of data is handled entirely by the hub cell 177, the hub cell may be included in the processor coherency domains of the border cells 100, 111, . . . . This enables the processors 92 in the border cells to communicate directly with the processor in the hub cell 177. For example it enables a processor 92 in a border cell to send an interrupt to alert the hub cell when the border cell has a new data packet to be copied to another border cell, rather than waiting for a processor 92 in the hub cell 177 to poll the memory controller 96 in the border cell. Furthermore, if the interrupt does not require a response to be sent from hub cell 177 to the cell transmitting the interrupt, then a cell in another partition may transmit an interrupt to hub cell 177 after placing data to be copied into the partition's border cell's memory. Defining the processor coherency domain and the memory controller coherency domain of a cell identically also simplifies communications routing, because messages do not have to be routed differently depending on which resource in a cell they originate from.

As shown in FIG. 2, the computer system 190 has one hub coherency domain with 8 cells and 7 spoke coherency domains, each with 7 cells. As explained above, the border cells 100 . . . 166 have their own processor and memory controller coherency domains, which in the interests of simplicity are not marked in FIG. 2. The system 190 has one hub partition P17 with a single cell, and 7 spoke partitions each with 7 cells. It will be seen that the number of spoke partitions P110 . . . P16 may be more or less, and is limited to one less than the number of cells in hub coherency domain C17. If levels of inter-spoke traffic are large, there may be more than one hub cell 177, although in that case the number of spokes will be correspondingly reduced. Each of the border cells 100, . . . 166 must allow both reads by and writes from the hub cell 177 of data for and from other spoke partitions. Consequently, security in these cells may be limited. In this embodiment, there is at least one hub cell 177 that belongs to partition P17 and does not belong to any coherency domain except C17. This cell can contain the core functionality of partition P 17 in an environment that is strongly protected from external disturbance. Hub cell 177 may be configured so that data being transferred from one border cell 100 . . . 166 to another is strictly segregated, in order to reduce the risk of the entire hub partition being disrupted by a rogue spoke partition.

If the address space format, as compared to the size of a cell, permits, the number of cells in a coherency domain may be greater than the 8 cells shown in FIG. 2. However large the coherency domain is, with the configuration shown in FIG. 2 the maximum number of cells in a spoke partition P10 . . . P16 is one less than the maximum number of cells in a coherency domain. The maximum number of spoke partitions P10 . . . P16 is one less than the number of cells in the hub coherency domain C17. Consequently, the maximum total system size is $(N-1)(N-1)+1$ cells, where N is the maximum number of cells in a coherency domain. That is 50 cells if N=8, or 226 cells if N=16, or 3970 cells if N=64.

However, within that maximum size, data can be transferred from any partition to any other partition with a maximum of three copy operations, or two if the border cells are permitted to copy to and from memory in the hub cell 177. The maximum latency involved in fetching data from another partition is therefore both smaller and more predictable than in the embodiment shown in FIG. 1.

Figure 3:
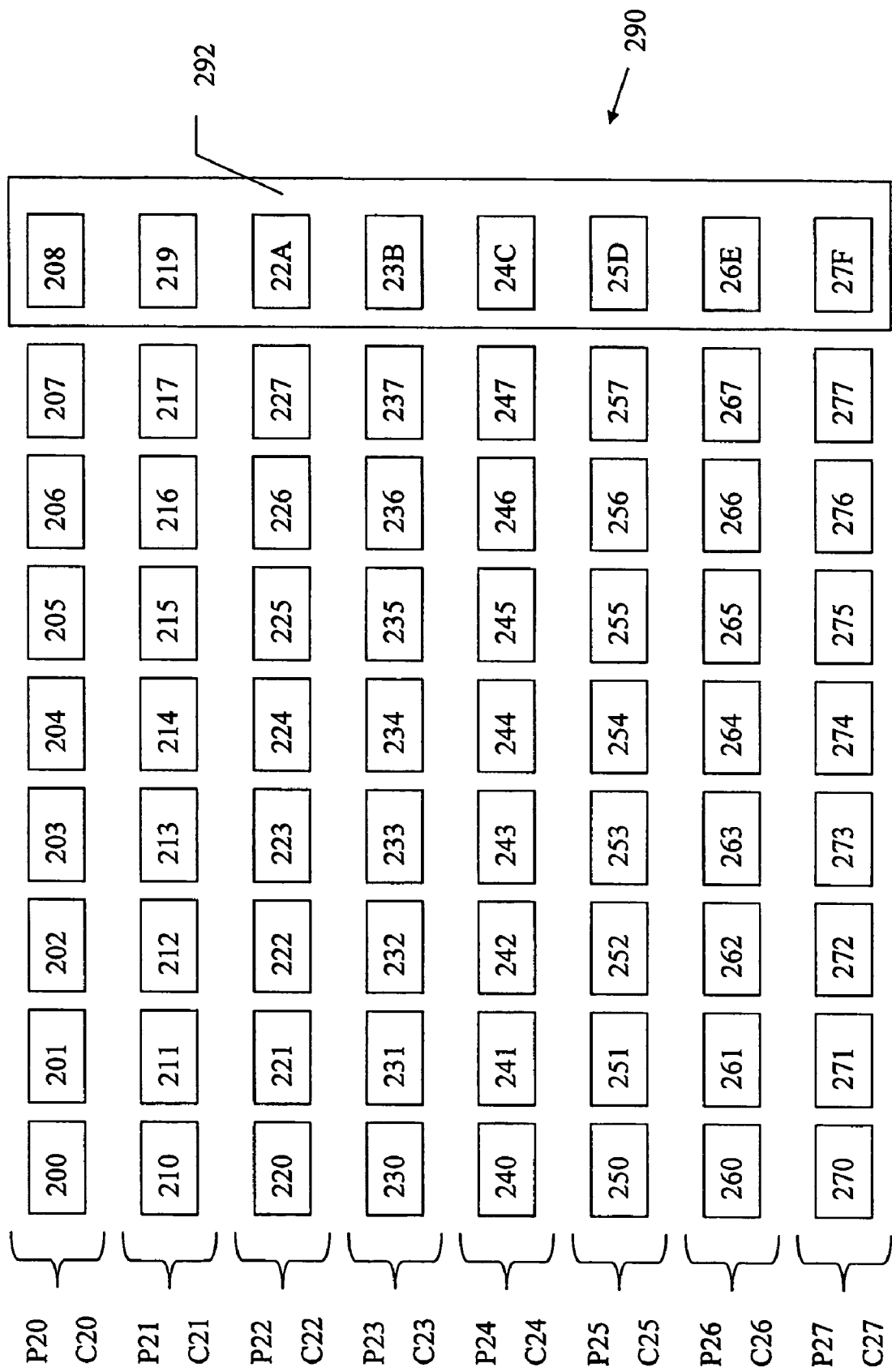
FIG. 3 is a block diagram of a third embodiment of a computer system according to an embodiment of the invention.

Referring now to FIG. 3, a third form of computer system according to an embodiment of the invention, indicated generally by the reference numeral 290, has a plurality of cells 200 . . . 27F, which are internally similar to the cell 00 shown in FIG. 1, each including, among other things, a processor 92, memory 94, and a memory controller 96. In this embodiment, each cell may be identical, and each cell is capable of addressing a coherency domain C20 . . . C27 of addresses. In this embodiment, the processor and memory controller coherency domains may be identical. In this embodiment, the cell is identified in addresses by the most significant bits of the address, corresponding to the right-hand digit of the cell number in FIG. 3. Memory accesses within a coherency domain can be fast, because the originating cell or processor can specify directly the address of the memory to be accessed, eliminating the latency that would be caused by interpreting an indirect address.

Each cell also belongs to a partition P20 . . . P27, identified by the second digit of the cell number in FIG. 3. In this embodiment, the processors 92 within a partition can freely read data from and write data to any memory within the same partition. Restrictions may be imposed on reading data from, and stricter restrictions may be imposed on writing data to, memory within another partition, even if the memory is within the coherency domain of the processor that originates the read or write.

In this embodiment, partition P20 contains cells 200, 201, 202, 203, 204, 205, 206, 207, 208. The cells in partition P20 belong to coherency domain C20. Partition P21 contains cells 210, 211, 212, 213, 214, 215, 216, 217, 219. The cells in partition P1 belong to coherency domain C1. Partition P22 contains cells 220, 221, 222, 223, 224, 225, 226, 227, 22A. The cells in partition P22 belong to coherency domain C22. Partition P23 contains cells 230, 231, 232, 233, 234, 235, 236, 237, 23B. The cells in partition P23 belong to coherency domain C23. Partition P24 contains cells 240, 241, 242, 243, 244, 245, 246, 247, 24C. The cells in partition P24 belong to coherency domain C24. Partition P25 contains cells 250, 251, 252, 253, 254, 255, 256, 257, 25D. The cells in partition P25 belong to coherency domain C25. Partition P26 contains cells 260, 261, 262, 263, 264, 265, 266, 267, 26E. The cells in partition P26 belong to coherency domain C26. Partition P27 contains cells 270, 271, 272, 273, 274, 275, 276, 277, 27F. The cells in partition P27 belong to coherency domain C27. Within each partition, the last digit of the cell number corresponds to the cell address. It will be seen that these addresses are unique only within the partition.

Each of the cells 208, 219, 22A, 23B, 24C, 25D, 26E, 27F, forming a bridge 292 between the partitions, has a globally unique address. A processor 92 in those bridge cells can address either another cell in the bridge 292 or a cell in its own partition unambiguously within the address scheme of its own coherency domain C20 . . . C27. In this embodiment, the globally unique cells in the bridge 292 are in the address space of every coherency domain. However, cells that are not in the bridge 292 are not permitted to address cells in other partitions, even if those cells are in the bridge. This avoids the situation where, for example, cell 222 could use globally unique cell address 9 to address cell 219, but cell 219 might then misidentify address 2, which is only locally unique, as meaning its own cell 212, rather than cell 222. This restriction eliminates the need to resolve ambiguities in locally, but not globally, unique addresses. In effect, therefore, a bridge cell has a coherency domain that includes the bridge plus the coherency domain of the cell's own partition. The other cells in the partition have a coherency domain that is a subset of the bridge cell's coherency domain.

In this embodiment shown in FIG. 3, data can be transferred between any two cells with only two transfer operations. For example, if data is to be transferred from cell 200 to cell 270, the data could be copied from cell 200 to bridge cell 208 by a processor in partition P20. Because cell 208 is in the bridge, it can be addressed by a processor in cell 27F, which can then copy the data directly to cell 270.

Alternatively, the data could be copied from cell 200 to bridge cell 27F by a processor in bridge cell 208. From cell 27F, the data can be accessed directly by a processor in the destination cell 270. However, for security, cells may be permitted to read from, but not to write to, cells in other partitions. In particular, bridge cells 208 . . . 27F are then permitted only to read from, and not to write to, each other. In that case, the transfer from cell 208 to cell 27F must be a read by cell 27F, not a write by cell 208, so this alternative transfer procedure would not be allowed. Conversely, a transfer from source cell 270 to destination cell 200 would require the data to be copied from cell 270 to bridge cell 27F by any processor in partition P27, and then copied to cell 200 by a processor in bridge cell 208.

In this embodiment the maximum number of cells is p*b, where p is the number of cells in a partition, b is the number of partitions sharing the bridge 292, and p+b−1≦N, where N is the maximum number of cells in an address space. The maximum is then usually (N/2+1)(N/2) cells. That is 20 cells if N=8, 72 cells if N=16, and 1056 cells if N=64. Having (N/2+1) cells in each of (N/2) partitions, rather than (N/2) cells in each of (N/2+1) partitions, will usually reduce the amount of traffic between partitions.

Although the invention has been described and illustrated with reference to exemplary embodiments thereof, it will be understood by those skilled in the art that various changes, omissions, and additions may be made thereto, without departing from the spirit and scope of the invention as recited in the attached claims. For example, the first two embodiments have been described with an address space containing 8 cells, and the third embodiment has been described with an address space containing 16 cells. The sizes of the address spaces may be larger or smaller, depending on the capabilities of the particular processors and fabrics used, and on the requirements of a particular system.

For simplicity, the embodiments have been described with a single chain, bridge, or hub to connect different coherency domains. However, the invention is not limited to such embodiments. For example, a cell in FIG. 2 or 3 that is shown as not forming part of the bridge or hub could form part of another bridge or hub linking to other partitions, or could be at the beginning of a chain. A suitably constructed network of bridges, hubs, and chains may allow a system of cells too large for the size limits in the bridge and hub systems, without the latency problem that a very long chain would cause.

Although in the interests of linguistic simplicity the embodiments shown in the drawings have been largely described as having one processor and one memory controller in each cell, there may be more than one processor 92 and/or more than one memory controller 96 in each cell. Although in the interests of linguistic simplicity in the embodiments shown in the drawings the cells are described as being the same, a single computer system may have cells that are not all the same. A single computer system may have processors and/or memory controllers that do not all have the same size of address space, and a single system may include coherency domains that are not all of the same size.

What is claimed is:

1. A multiprocessor computer system, comprising:
   a plurality of processors, wherein each processor has an address space directly addressable by the processor, and
   a plurality of partitions each within one of the address spaces,
   wherein each address space is directly linked to at least one other address space by memory within both of those address spaces; and wherein the total size of the address spaces within the system linked together either directly or through directly linked address spaces may be greater than the address space a resource within the system can address directly, and
   wherein at least one address space includes memory within a partition mostly outside said at least one address space.

2. A computer system according to claim 1, wherein at least one address space is shared by a plurality of processors.

3. A computer system according to claim 1, comprising at least three address spaces forming a chain wherein a pair of address spaces adjacent in the chain have at least one region of memory within both address spaces of the pair.

4. A computer system according to claim 3, further comprising a first address space having only one adjacent address space with which the first address space is linked by memory within both the first address space and the adjacent address space and a last address space having only one adjacent address space with which the last address space is linked by memory within both the last address space and the adjacent address space.

5. A computer system according to claim 1, comprising at least three address spaces including a hub address space, and wherein address spaces other than the hub address space include at least one region of memory within the hub address space, and wherein address spaces other than the hub address space do not include memory within other address spaces other than the hub address space.

6. A computer system according to claim 1, comprising at least three address spaces, and further comprising at least one region of memory wherein said at least one region of memory is in every address space.

7. A multiprocessor computer system, comprising:
a plurality of processors, each processor having an address space directly addressable by the processor,
each address space being directly linked to at least one other address space by memory within both of those address spaces; and wherein the total size of the address spaces within the system linked together either directly or through directly linked address spaces may be greater than the address space a resource within the system can address directly,
wherein the said address spaces are processor address spaces, wherein a processor can address resources directly within a processor address space, further comprising memory controllers having memory controller address spaces, wherein a memory controller can address resources directly within a memory controller address space, wherein said memory controller address spaces are not identical to the processor address spaces.

8. A computer system, comprising:
a first processor within a first coherency domain and outside a second coherency domain;
a second processor within the second coherency domain and outside the first coherency domain;
a plurality of partitions each within a coherency domain, and
at least one region of memory within both the first coherency domain and the second coherency domain;
wherein the first and second processors are arranged to communicate by writing to and reading from the at least one region of memory; and
at least one of the coherency domains including memory within a partition mostly outside said at least one coherency domain.

9. A computer system according to claim 8, wherein the coherency domains comprise a plurality of processors.

10. A computer system according to claim 8, comprising at least three coherency domains in a chain, and wherein each pair of coherency domains adjacent in the chain have at least one region of memory within both coherency domains of the pair.

11. A computer system according to claim 10, further comprising a first coherency domain having only one adjacent coherency domain in the chain and a last coherency domain having only one adjacent coherency domain in the chain.

12. A computer system according to claim 8, comprising at least three coherency domains including a hub coherency domain, and wherein each coherency domain other than the hub coherency domain includes at least one region of memory within the hub coherency domain, and wherein coherency domains other than the hub coherency domain do not include memory within other coherency domains other than the hub coherency domain.

13. A computer system according to claim 8, comprising at least three coherency domains, and further comprising at least one region of global memory wherein said at least one region of global memory is in every coherency domain.

14. A computer system according to claim 8, wherein the total memory space within coherency domains connected through one or more regions of memory within more than one coherency domain is greater than the maximum address space a processor in the system is capable of addressing directly.

15. A computer system according to claim 8, wherein the said coherency domains are processor coherency domains, further comprising memory controllers having memory controller coherency domains, wherein said memory controller coherency domains are not identical to the processor coherency domains.

16. A partitioned computer system, comprising:
a plurality of partitions, each comprising at least one processor, and
a plurality of coherency domains, and
wherein each partition is in an associated coherency domain and at least one coherency domain includes memory within a partition other than the partition associated with said at least one coherency domain,
a plurality of said coherency domains being linked together by memory within more than one coherency domain contains a total address space greater than the maximum address space a resource in the system can address directly.

17. A computer system according to claim 16, comprising a plurality of said partitions forming a chain wherein for each pair of adjacent partitions in said chain there is memory within one of the partitions of the pair and within both of the associated coherency domains.

18. A computer system according to claim 16, comprising a hub partition having an associated coherency domain, wherein said coherency domain associated with said hub partition includes a portion of the memory in each other partition.

19. A computer system according to claim 16, wherein each partition includes globally accessible memory, and every partition is in a coherency domain including the globally accessible memory.

20. A multiprocessor computer system, comprising:
cells comprising at least a processor and memory;
the processors having access to processor coherency domains smaller than the system; and
at least one cell within the processor coherency domains of at least two other cells, wherein said at least two other cells are not in the processor coherency domains of each other.

21. A computer system according to claim 20, wherein the processor coherency domains comprise a plurality of cells having access to the same processor coherency domain.

22. A computer system according to claim 20, comprising a chain of processor coherency domains wherein each processor coherency domain in the chain includes a cell within each adjacent processor coherency domain in the chain.

23. A computer system according to claim 22, wherein the chain further comprises a first processor coherency domain having only one adjacent processor coherency domain in the chain and a last processor coherency domain having only one adjacent processor coherency domain in the chain.

24. A computer system according to claim 20, comprising a hub coherency domain and spoke coherency domains, and wherein each spoke coherency domain includes a cell within the hub coherency domain.

25. A computer system according to claim 20, comprising at least three coherency domains, wherein at least one cell from each coherency domain is in all of the at least three coherency domains.

26. A computer system comprising a plurality of partitions each comprising cells sharing an associated coherency domain, and wherein at least one coherency domain includes a cell within a partition other than the partition associated with said at least one coherency domain, and comprising a hub partition having an associated coherency domain including cells in a plurality of other partitions.

27. A computer system comprising a plurality of partitions each comprising cells sharing an associated coherency domain, at least one said coherency domain including a cell within a partition other than the partition associated with said at least one coherency domain, and wherein a plurality of the partitions form a chain, wherein for each pair of adjacent partitions in the chain there is a cell within one of the partitions of the pair and within both of the associated coherency domains.

28. A computer system according to claim 27, wherein each pair of adjacent partitions comprises two cells, one of said two cells being in each partition of said pair of adjacent partitions, both of said two cells being in both of the coherency domains associated with said pair of adjacent partitions.

29. A computer system according to claim 28, wherein each cell within one partition and within a coherency domain associated with another partition is readable, but not writeable, from said other partition.

30. A computer system according to claim 26, wherein a plurality of the partitions include globally accessible cells, and said globally accessible cells have processor coherency domains including the cells in the associated partition and the globally accessible cells.

31. A computer system, comprising:

first means for processing within a first coherency domain and outside a second coherency domain;

second means for processing within the second coherency domain and outside the first coherency domain;

means defining a plurality of partitions each within a coherency domain; and memory means within both the first coherency domain and the second coherency domain;

wherein the first and second processing means are arranged to communicate by writing to and reading from the memory means; and wherein at least one coherency domain includes memory means within a partition mostly outside said at least one coherency domain.

32. A computer system according to claim 31, comprising means defining at least three coherency domains, and further comprising a memory means within all of at least three coherency domains.

33. A computer system according to claim 31, wherein the total memory space within coherency domains connected through one or more memory means within more than one coherency domain is greater than the maximum address space any processing means in the system is capable of addressing directly.

34. A computer system according to claim 31, wherein the said coherency domains are processing means coherency domains, further comprising memory controlling means having memory controlling means coherency domains, wherein said memory controlling means coherency domains are not identical to the processing means coherency domains.

* * * * *

UNITED STATES PATENT AND TRADEMARK OFFICE
CERTIFICATE OF CORRECTION

PATENT NO. : 7,277,994 B2
APPLICATION NO. : 10/947673
DATED : October 2, 2007
INVENTOR(S) : Gary Belgrave Gostin et al.

It is certified that error appears in the above-identified patent and that said Letters Patent is hereby corrected as shown below:

In column 5, line 64, delete "P110 ... P16" and insert -- P10 ... P16 --, therefor.

Signed and Sealed this

Seventeenth Day of June, 2008

JON W. DUDAS
*Director of the United States Patent and Trademark Office*